US010151273B2

(12) United States Patent
Dudar

(10) Patent No.: US 10,151,273 B2
(45) Date of Patent: Dec. 11, 2018

(54) METHODS AND SYSTEMS FOR EVAPORATIVE EMISSIONS CONTROL

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/233,568

(22) Filed: Aug. 10, 2016

(65) Prior Publication Data
US 2018/0045143 A1 Feb. 15, 2018

(51) Int. Cl.
| F02M 25/08 | (2006.01) |
| F02M 37/00 | (2006.01) |
| G01M 3/22 | (2006.01) |
| G01M 3/02 | (2006.01) |

(52) U.S. Cl.
CPC .... *F02M 25/0809* (2013.01); *F02M 25/0836* (2013.01); *F02M 25/0854* (2013.01); *F02M 37/0076* (2013.01); *G01M 3/025* (2013.01); *G01M 3/226* (2013.01)

(58) Field of Classification Search
CPC .......... F02M 25/0809; F02M 25/0836; F02M 25/0854; F02M 37/0076; F02D 41/0045; G01M 3/025; G01M 3/226
See application file for complete search history.

(56) References Cited

U.S. PATENT DOCUMENTS

| 4,791,805 A | 12/1988 | Gates |
| 5,570,672 A | 11/1996 | Kunimitsu et al. |
| 2003/0019286 A1* | 1/2003 | Wakahara .......... F02M 25/0809 73/114.41 |
| 2006/0081036 A1 | 4/2006 | Lehmann |
| 2011/0067777 A1 | 3/2011 | Reddy |
| 2014/0107906 A1* | 4/2014 | Jentz .................. F02M 37/0088 701/102 |

FOREIGN PATENT DOCUMENTS

DE 102010033013 * 3/2011 .......... G01M 3/3227

OTHER PUBLICATIONS

English Machine Translation of Schumacher et al., DE 10 2010 033 013 A1, Mar. 17, 2011, Translated Mar. 1, 2018.*

* cited by examiner

*Primary Examiner* — Hezron E Williams
*Assistant Examiner* — David Z Huang
(74) *Attorney, Agent, or Firm* — Julia Voutyras; McCoy Russell LLP

(57) ABSTRACT

Methods and systems are provided for reducing evaporative emissions from a vehicle by performing a fine leak test at a vehicle assembly plant. Fuel tank pressure generated after a green tank fueling event is monitored as the vehicle moves along an assembly line. A leak is determined based on a rate of pressure bleed-up over the duration, and accordingly the vehicle is directed to a repair station.

20 Claims, 5 Drawing Sheets

METHODS AND SYSTEMS FOR EVAPORATIVE EMISSIONS CONTROL

FIELD

The present description relates generally to methods and systems for reducing evaporative emissions from a green engine of a vehicle after vehicle assembly.

BACKGROUND/SUMMARY

Undesired evaporative emissions may be identified using engine-off natural vacuum (EONV) during conditions when a vehicle engine is not operating. In particular, during engine operation, heat may be rejected to the fuel tank resulting a rise in fuel tank pressure. When the engine is subsequently turned off, the temperature at the fuel tank starts to decrease with a corresponding drop in pressure. After a sufficient amount of time has elapsed over which the temperature continues to drop, the pressure may drop sufficiently to create a natural vacuum in the fuel tank. If the fuel tank is isolated at this time (that is, sealed from the engine and the atmosphere), the vacuum will hold steady. However, if there is a leak in the fuel system, the vacuum will dissipate to ambient pressure, a rate of the vacuum dissipation based on the size of the leak. In this way, fine leaks in the fuel system (such as those as small as 0.02") can be identified and addressed.

However, EONV leak tests take a long time to run. As an example, detection of a 0.02" orifice leak may take 45 mins to an hour, or longer. Due to time constraints, EONV tests are not run during vehicle production in an assembly plant. A time-consuming fine leak test may be forgone in favor of a faster gross leak test (such as those capable of detecting a 0.04" orifice). In one example, the gross leak tests may be completed in less than ten seconds at an end of line station of the assembly plant.

Various attempts have been developed to enable a faster leak detection at an assembly plant, before the vehicle leaves the plant. One example approach is shown by Gates et al. in U.S. Pat. No. 4,791,805. Therein, the fuel tank is placed in a vacuum chamber while a test gas is injected into the tank. Leaks are detected by the presence of the test gas in the vacuum chamber, as detected by a sensor sensitive to the test gas. In still other approaches, a leak is detected based on a pressure change in the vacuum chamber.

However, the inventors herein have recognized potential issues with such systems. As one example, the approaches described above require additional components, such as additional vacuum chambers and vacuum pumps that add to system cost and complexity. As another example, even with the added components, the presence of fine leaks may not be detectable in the time frame available at a vehicle production line of an assembly plant (e.g., in the order of 10 seconds or less). Consequently, vehicles may leave the assembly plant with fine leaks left undetected. This can cause increased warranty issues at low vehicle mileage. For example, when an EONV test is run for a first time, after the vehicle has been received by a customer, a fine leak may be detected and a diagnostic code may be set.

The inventors herein have recognized that when a fuel tank is "green", that is it has never been fueled with fuel hydrocarbons, such as at a vehicle assembly plant, a significant pressure may build up inside it. When fuel is dispensed into the virgin fuel tank full of air, the cooled sprayed fuel may instantly flash, generating high fuel tank pressure. This "noise" energy can be advantageously used to perform a fine leak detection while the vehicle is moving on an assembly line conveyor. An example method for leak detection may comprise, on only a first initial fuel tank filling event while a vehicle is on an assembly line, with no prior fuel filling event, filling the fuel tank to a threshold level and sealing the fuel tank; and indicating degradation of a fuel system based on a change in fuel tank pressure while the vehicle moves along the assembly line. In this way, fine leak detection may be performed at an assembly plant without adding cycle time to an end of line (EOL) station.

As one example, after a vehicle has been assembled at an assembly plant, each vehicle subsystem may be tested at distinct end of line stations. When the vehicle reaches a station where a first virgin fill event of a "green" fuel tank is performed, a fine leak test mode may be initiated. As such, the first fill event may be a first fill event from an initial assembly of the vehicle (or at least initial assembly of the fuel system) at an assembly plant in which the vehicle is built. At the time of the first fill event, the engine may be shutdown and may have been run before. That is, a first ever combustion event in the engine since the initial assembly of the vehicle may not have occurred yet. Therein, once a threshold fill level has been reached in the green fuel tank (e.g., when the fuel tank is 15-20% full), the fuel tank may be sealed by closing a vent valve, thereby trapping the pressure generated (due to fuel flashing) during the filling of the fuel tank. The vehicle then continues to move along the assembly line to one or more other EOL stations with the engine maintained off. As such, the vehicle may spend a significant amount of time (e.g., multiple minutes) on the moving line before it reaches the end of the conveyor where the engine is started for a very first time, providing ample time for monitoring the change in pressure at the fuel tank for a fine leak. For example, the generation and/or dissipation of a natural vacuum in the fuel tank may be monitored as the vehicle transits with the engine off at the assembly plant post a first fill event. Before the engine is cranked at a last EOL station and a first ever combustion event of the virgin engine is completed, the leak test may be terminated, and an indication of fuel system degradation may be provided if the pressure changed faster than expected over the duration of monitoring.

In this way, green fuel tank pressure may be advantageously leveraged to perform a fine leak detection at a vehicle assembly plant. The technical effect of using the high pressure generated in the fuel tank during a first ever fuel tank fill event is that the need for additional leak detection components, such as pressure pumps or vacuum chambers, is reduced. By monitoring the change in fuel tank pressure as the vehicle moves along the assembly line following the first fill event, the leak detection may be completed without adding cycle time to any end of line (EOL) station. In addition, errors in leak detection due to the effect of exhaust heat rejection on the liquid fuel in the fuel tank (during engine operation or immediately after an engine shut-down) are reduced. By using the noise generated in a green fuel tank for completing fine leak detection despite the time constraints at an assembly plant, the accuracy and reliability of leak tests performed at the assembly plant is improved. By enabling both fine and gross leak detection to be completed within the limited time at an assembly plant, premature warranty issues are reduced. Overall, vehicle evaporative emissions quality is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
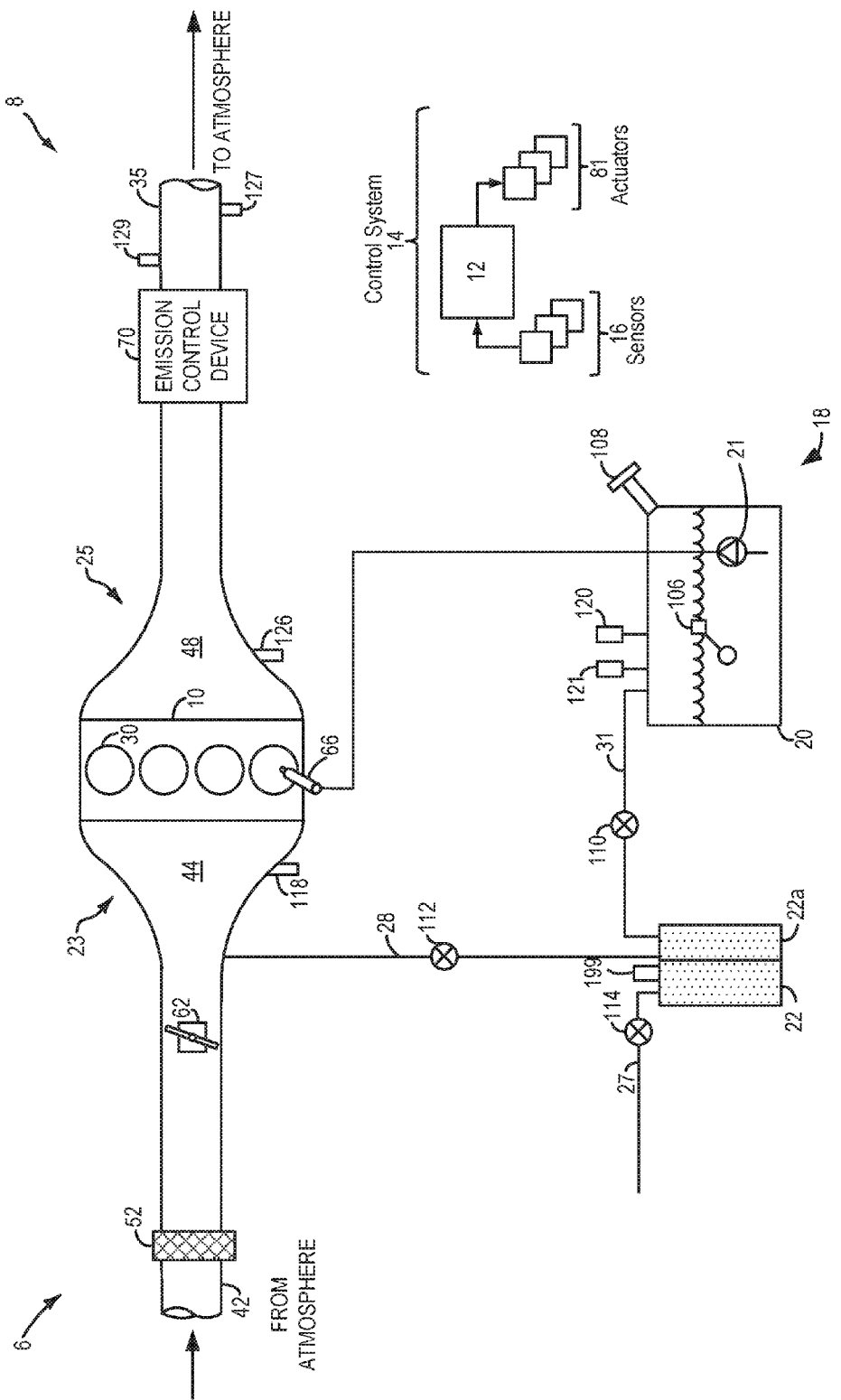
FIG. 1 schematically shows a fuel system and an emissions system for an example vehicle engine.
Figure 3:
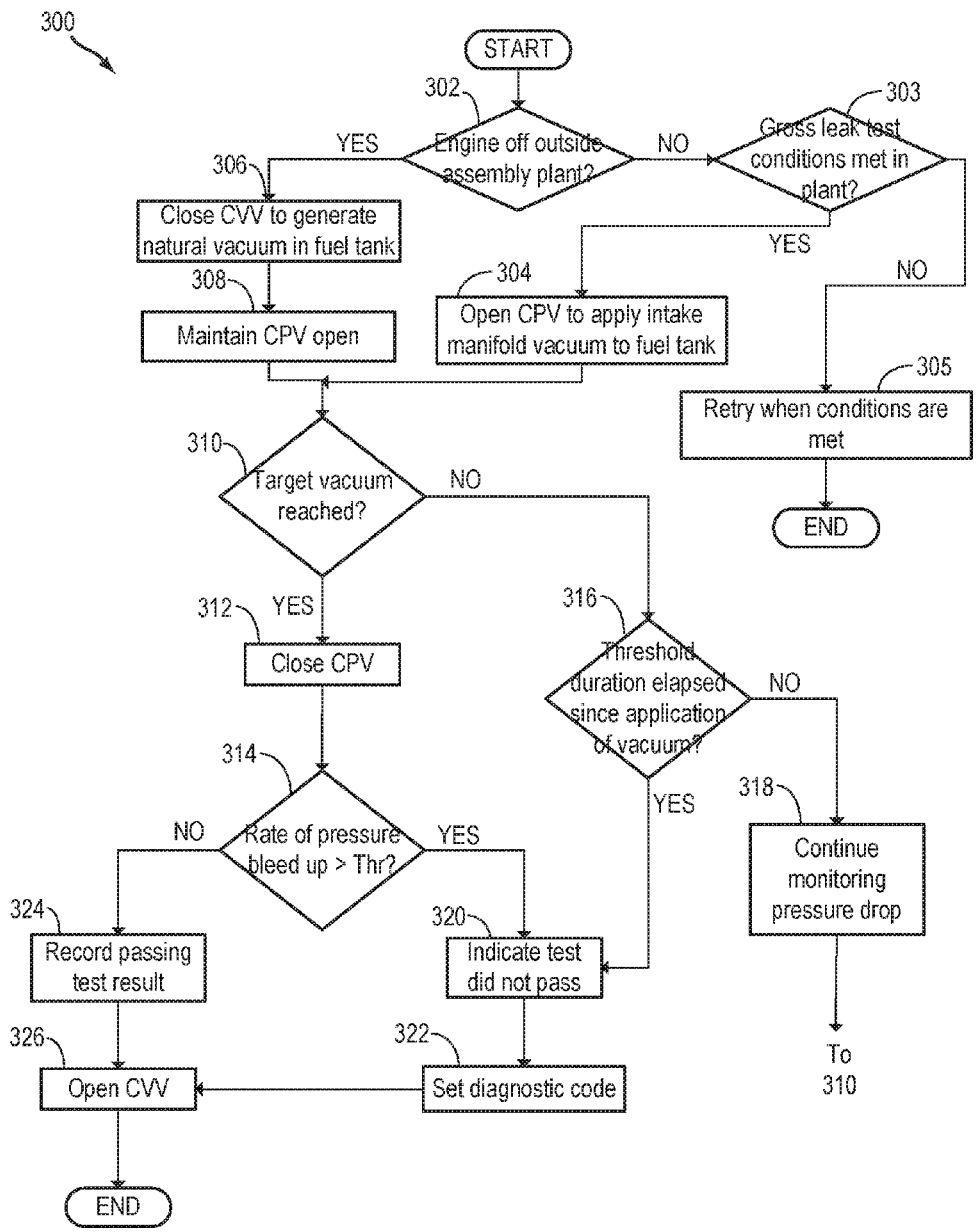
FIG. 3 shows a high level flow chart illustrating an example routine that may be implemented for performing an engine-off natural vacuum test outside an assembly plant, and an engine running vacuum test inside the assembly plant.
Figure 4:
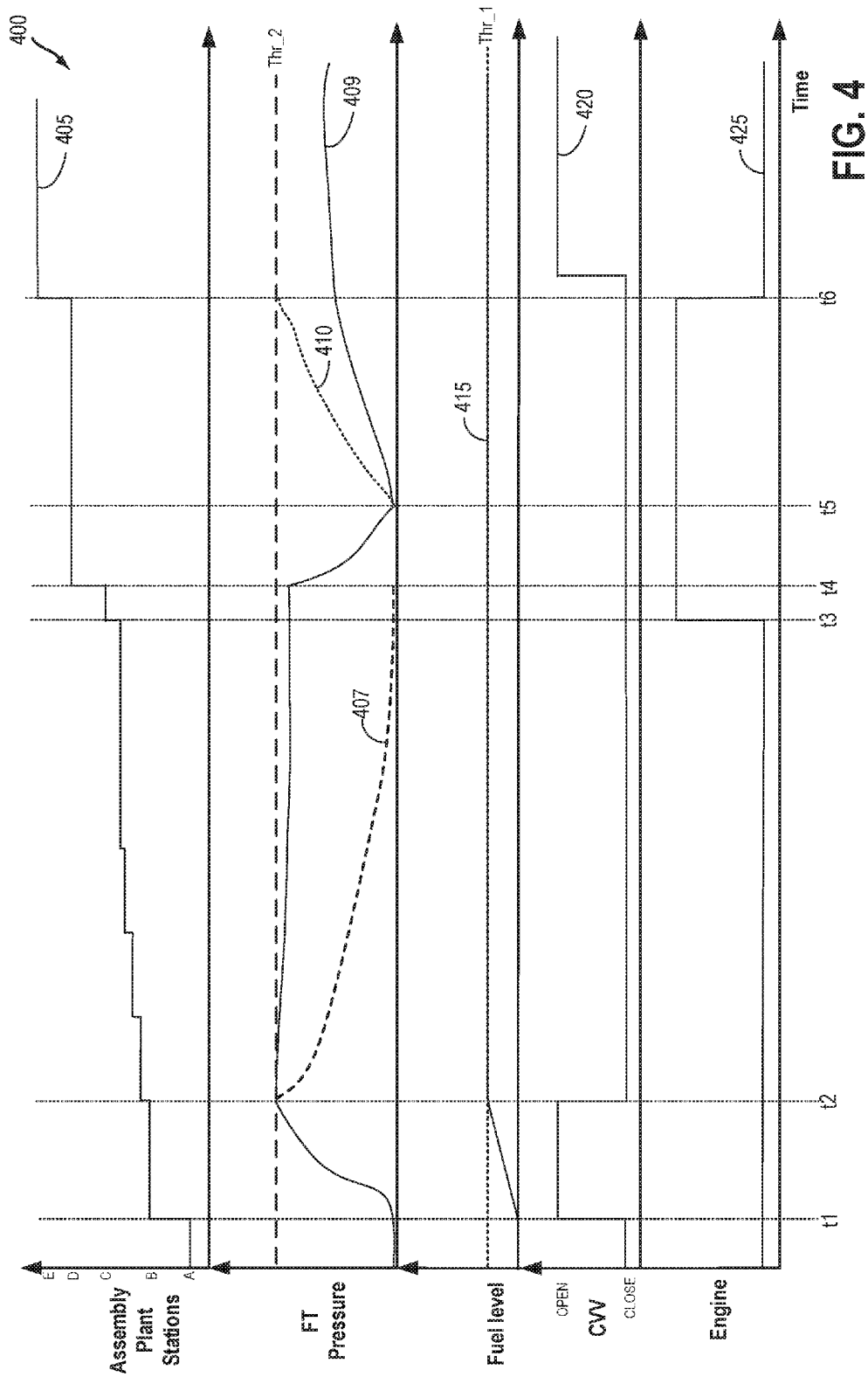
FIG. 4 shows an example timeline for performing leak detection tests on a fuel tank while at an assembly plant.
Figure 5:
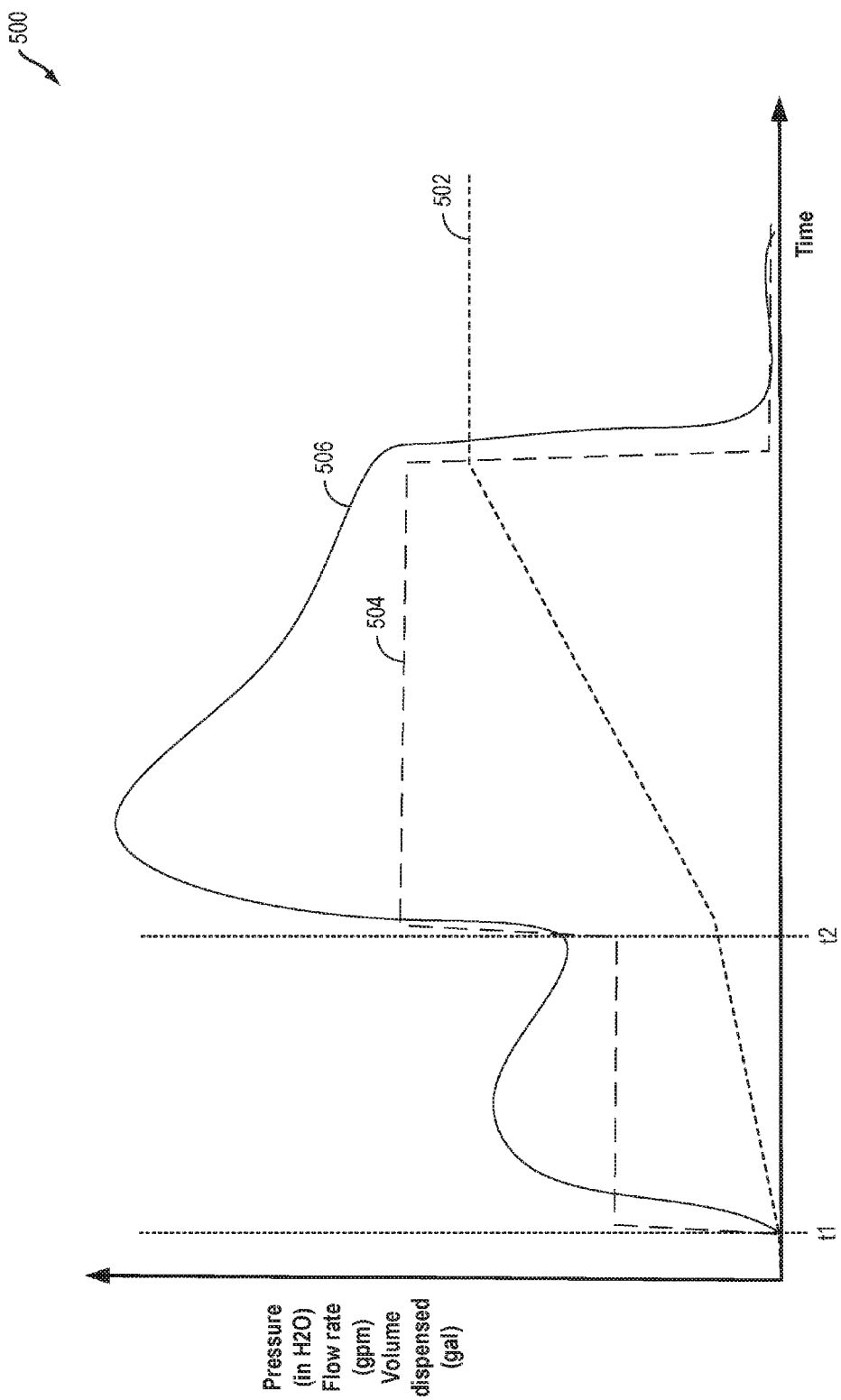
FIG. 5 shows an example pressure profile of a green tank effect.

The following description relates to systems and methods for reducing evaporative emissions from a vehicle by performing an evaporative emissions test on a vehicle fuel system, such as the vehicle fuel system of FIG. 1, while at a vehicle assembly plant. A controller may be configured to perform a test, such as the fine leak test of FIG. 2, following a virgin fuel tank fill event as the vehicle moves through stations of an assembly plant. The fine leak test may take advantage of the high pressure generated during a virgin fill event via a green tank effect (FIG. 5). The fine leak test may be a longer, slower test that is distinct from a shorter gross leak test performed using engine-running vacuum at an end of line station of the assembly plant, as shown in FIG. 3. An example timeline of evaporative emissions tests performed on a vehicle fuel system at an assembly plant is shown at FIG. 4.

FIG. 1 shows a schematic depiction of a vehicle system 6 that is configured for on-road propulsion using power at least from an internal combustion engine, such as engine system 8. In one example, vehicle system 6 may be a hybrid vehicle system that can derive propulsion power from an on-board energy storage device, such as a battery system, in addition to engine system 8. When configured as a hybrid vehicle system, an energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, engine system 8 is a boosted engine system including a boosting device, such as a turbocharger.

Engine system 8 is coupled to a fuel system 18. Fuel system 18 includes a fuel tank 20 coupled to a fuel pump 21 and a fuel vapor canister 22. During a fuel tank filling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank filling or refueling operations, as well as diurnal vapors. In one example, the adsorbent used is activated charcoal. Canister 22 may include a buffer 22a (or buffer region), each of the canister and the buffer comprising the adsorbent. In some examples, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer may not be linear with the loading and unloading of the canister. As such, the effect of the canister buffer may be to dampen fuel vapor spikes flowing from the fuel tank to the canister, thereby reducing the possibility of any fuel vapor spikes going to the engine.

When purging conditions are met, such as when the canister is saturated, vapors stored in fuel vapor canister 22 may be purged to engine intake 23 by opening canister purge valve (CPV) 112. Canister 22 is coupled to the engine via the purge valve. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 further includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. Canister 22 is coupled to the atmosphere via the vent valve. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. The canister vent valve may also be operated during diagnostic routines, such as the evaporative emissions diagnostic routines of FIG. 2-3, to isolate the fuel tank from the atmosphere by closing the vent valve. In one example, canister vent valve 114 may be a solenoid valve wherein opening or closing of the valve is performed via actuation of a canister vent solenoid. In particular, the canister vent valve may be an open valve that is closed upon actuation of the canister vent solenoid. In some examples, an air filter may be coupled in vent 27 between canister vent valve 114 and atmosphere.

As embodiments where the vehicle system is a hybrid vehicle system, the vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20. The fuel system may be considered to be sealed when isolation valve 110 is closed. In embodiments where the fuel system does not include isolation valve 110, the fuel system may be considered sealed when purge valve 112 and canister vent valve 114 are both closed.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Further, one or more hydrocarbon (HC) sensors 199 may be used to determine the loading state of the canister. For example, a percentage of HCs as fuel vapor that is adsorbed by the adsorbent in the canister during canister loading may be inferred based on the output of the HC sensors.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing CPV 112 to direct refueling vapors into canister 22 while preventing fuel vapors from being directed into the intake manifold.

As another example, the fuel system may be operated in a refueling mode (e.g., when fuel tank filling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

One or more leak detection routines may be intermittently performed to confirm that the fuel system is not degraded. For example, the fuel system may be operated in a diagnostics mode while at an assembly plant, as well as after vehicle delivery to a customer, to perform one or more diagnostic tests. The diagnostics mode may be selected to check a level of evaporative emissions from the fuel system. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

The inventors herein have recognized that leak tests that diagnose for a smaller orifice (such as fine leaks in the range of 0.02") may require a longer time of monitoring and therefore a longer time to complete (e.g., in the range of 3 minutes). In comparison, leak tests that diagnose for a larger orifice (such as gross leaks in the range of 0.04") may require a shorter time of monitoring and therefore a shorter time to complete (e.g., in the range of 10 seconds). Due to the time constraints at a vehicle production line of an assembly plant, it may not be possible to complete a fine leak test and vehicles may be released upon completion of a gross leak test only. This can result in increased warranty issues at low vehicle mileage. For example, when an EONV test is run for a first time after the vehicle has been received by a customer, a fine leak may be detected and a diagnostic code may be set. To address this issue, an EONV based fine leak test may be initiated at the assembly plant immediately after the fuel tank has been filled to a threshold level for a very first time (that is, when the fuel tank is green and has never been filled with fuel before, and wherein the fuel tank fill event is a virgin fill event). Therein, when fuel is dispensed into the virgin fuel tank full of air (because it has never received fuel before since assembly of the fuel system), the cooled sprayed fuel may instantly flash, generating high fuel tank pressure. This "noise" energy can be advantageously used to perform a fine leak detection while the vehicle continues to move on an assembly line conveyor to one or more stations with the engine maintained off, as elaborated with reference to FIG. 2. This allows a fine leak detection to be completed at the assembly plant without adding cycle time to an end of line (EOL) station. In particular, the fine leak detection may be completed even before a first ever combustion event in the engine since vehicle assembly at the plant is completed. Still other engine running gross leak detection routines may be performed at the assembly plant, as well as other EONV leak detection routines may be performed after the vehicle has left the plant, such as described at FIG. 3.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include heated exhaust gas oxygen sensor (HEGO) 126 located upstream of the emission control device, catalyst monitor sensor (CMS) 127 located downstream of the emission control device, MAP sensor 118, pressure sensor 120, and pressure sensor 129. Other sensors such as additional pressure, temperature, air/fuel ratio, and composition sensors may be coupled to various locations in the vehicle system 6. For example, ambient temperature and pressure sensors may be coupled to the exterior of the vehicle body. As another example, the actuators may include fuel injector 66, isolation valve 110, purge valve 112, vent valve 114, fuel pump 21, and throttle 62.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may receive input data from the various sensors 16, process the input data, and trigger the actuators 81 in response to the processed input data based on instruction or code programmed therein corresponding to one or more routines. For example, based on input from a fuel level sensor of the fuel tank, the controller may initiate a leak test following a first fuel tank refill event, with no refills before that in the vehicle history. The leak test may be initiated by closing the canister vent valve and the purge valve after a threshold fill level is reached and monitoring a change in fuel tank pressure, based on input from a fuel tank pressure sensor, afterwards.

In this way, the components of FIG. 1 may enable a vehicle system, comprising: a vehicle including an engine; a fuel system including a fuel tank, a canister, a purge valve coupling the canister to the engine, and a vent valve coupling the canister to atmosphere; a pressure sensor coupled to the fuel tank; and a controller. The controller may be configured to include computer readable instructions stored on non-transitory memory for: moving the vehicle, on a conveyor, between stations of an assembly plant; at a first station, following assembly of the vehicle and before a first combustion event in the engine since the assembly, filling the fuel tank to a threshold level on a first filling event in a fill history of the fuel tank; then isolating the fuel tank from atmosphere by closing the vent valve; monitoring fuel tank pressure as the vehicle moves along the conveyor from the first station to a second station; and at the second station, indicating the presence of an orifice in the fuel system based on a rate of pressure bleed-down of the monitored fuel tank pressure. The controller may include further instructions for: moving the vehicle through one or more stations of the assembly plant when moving the vehicle from the first station to the second station; and performing the first combustion event in the engine since the assembly of the vehicle at the second station. The orifice may have a first diameter, and the controller may include further instructions for: moving the vehicle from the second station to a third station; at the third station, with the engine running, applying an engine vacuum on the fuel tank; then isolating the fuel tank from atmosphere; and indicating the presence of an orifice having a second diameter, larger than the first diameter, in the fuel system based on a rate of fuel tank pressure bleed-up following the isolating.

Figure 2:
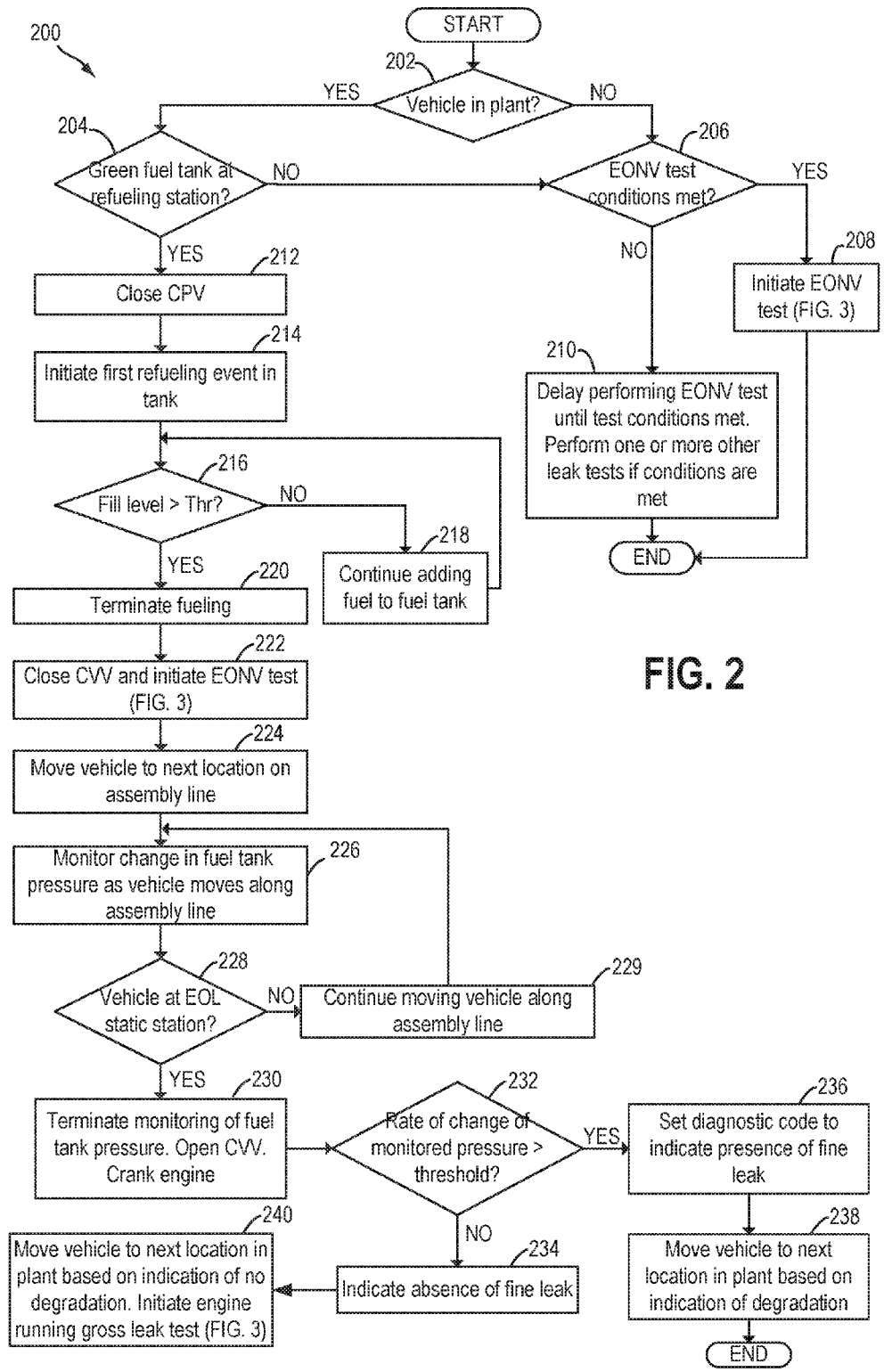
FIG. 2 shows a high level flow chart illustrating an example routine that may be implemented for performing an engine off natural vacuum leak detection test on a green fuel tank inside an assembly plant.

Now turning to FIG. 2, an example routine 200 is shown for performing leak detection tests on a vehicle fuel system at one or more stations of an assembly plant. The routine includes applying negative pressure on the fuel system and identifying a fuel system leak based on a subsequent change in fuel system pressure. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Beginning at 202, it may be determined if the vehicle is in an assembly plant. In one example, the vehicle may be in the assembly plant during assembly of the vehicle and/or assembly of vehicle sub-systems (e.g., fuel system, engine system, etc.), as well as immediately after assembly while vehicle components and sub-systems are being checked. As such, it may be confirmed that the vehicle is still in the assembly plant if the vehicle has not yet left the plant and been delivered to a customer/vehicle operator.

If the vehicle is not in the assembly plant and the vehicle has been delivered to a customer, then at 206, it may be determined if engine-off natural vacuum (EONV) leak test conditions have been met. As such, after vehicle delivery, the fuel system of the vehicle may be intermittently diagnosed for evaporative emissions. In one example, EONV leak test conditions may be considered met if a threshold duration (or threshold distance of vehicle travel) has elapsed since a last EONV test was performed. Upon confirming EONV test conditions being met, at 208, an EONV test may be initiated, as elaborated with reference to FIG. 3. If EONV test conditions have not been met outside the plant, at 210, the EONV test may be delayed until test conditions are met. Optionally, one or more other leak tests, such as engine running leak tests that do not require the engine to be off, or require engine off vacuum generation, may be opportunistically performed while the vehicle is outside the assembly plant until EONV leak test conditions are met.

If the vehicle is in the assembly plant, such as when the vehicle is still under assembly and is moving along an assembly line of the plant on a conveyor belt, then at 204, it may be determined if the fuel tank in the fuel system of the vehicle is a green fuel tank at a fueling station. That is, it may be determined if the fuel tank is in a "green mode" when at the fueling station. As such, the "green mode" indicates that the fuel tank has not received fuel any time before in the fueling history of the tank. In other words, the filling event at the fueling station is a first filling event of the fuel tank with no prior filling event. The first filling event may also be referred to as a virgin fuel tank filling event. A controller may count a number of fill events that have occurred since assembly of the vehicle and the green fuel tank event at the fueling station may be confirmed if the number is 1. That is, the fill event is the first full event since an initial build/assembly of the fuel system and/or vehicle assembly with no prior fill event in the fuel tank occurring before that.

If the fuel tank is determined to not be in the "green mode", such as when more than a threshold number (e.g., more than 1) of fuel tank refill events have elapsed at the assembly plant, or if the vehicle is not at the fueling station, the routine continues to 206 to determine if EONV test conditions are met. If so, an EONV leak test may be performed. Else, one or more other engine-off leak tests, or engine running leak tests may be performed at defined line stations as the vehicle continues to move along the assembly line after the fuel tank is refilled. For example, an engine-off leak test may be performed at an end of line station to identify a gross leak. Details regarding the EONV test for gross leak detection are provided at FIG. 3.

If a green or virgin fill event of the fuel tank at the fueling station is confirmed, then the engine is maintained shutdown in preparation of fuel tank filling and routine 200 may continue to 212 to close the canister purge valve (such as CPV 112 of FIG. 1). For example, the controller may send a signal to a canister purge solenoid to actuate the purge valve closed. By closing the CPV, the fuel tank is isolated from the engine intake manifold, allowing fueling fuel vapors to be trapped inside the fuel system canister.

Next at 214, a first virgin or green refill event of the fuel tank may be initiated. The first ever filling of the fuel tank may be performed when the vehicle is at a first station of the assembly line in the plant, the first station including a fueling station. In this way, filling of the green fuel tank includes a first fill event of the fuel tank following assembly of the vehicle with no intermediate refill events. In response to the filling of the green fuel tank, a fuel system leak test may be performed as elaborated below wherein the fuel tank is sealed and a change in fuel tank pressure is monitored as the vehicle moves along stations at the assembly plant with the engine shutdown.

As such, when the fuel tank is "green", and has never been filled with fuel hydrocarbons, a significant pressure may build up inside it. When fuel is dispensed into the virgin fuel tank that is full of air, the cooled sprayed fuel may instantly flash, generating high fuel tank pressure. Also as the fuel is dispensed, the air in the tank is expelled towards the restrictive canister. Air does not adsorb in the carbon inside the canister. Instead it tries to find its way to the fresh air port. This restriction creates more backpressure inside the fuel tank vapor dome. The combination of the fuel flashing and the canister restriction creates a "green tank effect" where there is a significant rise in fuel tank pressure at the virgin fill event. The rise in pressure in the green fuel tank is monitored, such as via a fuel tank pressure sensor. As hydrocarbons enter the tank, the tank has only air and the partial pressure is disturbed initially. Over time, as fueling continues, partial pressures may reach equilibrium. In comparison, with a non-green or aged fuel tank (where one or more filling events have already occurred), during fueling, the fuel tank vapor dome contains an air and fuel vapor mixture that is already in equilibrium. Hence when the fuel is dispensed, there is less flashing, and the air and fuel mixture enters the canister. The fuel vapors are adsorbed and this relieves the overall pressure in the system. As such, the fill event may occur with the engine never having run before.

An example depiction of the green tank effect is shown with reference to FIG. 5. In particular, map 500 of FIG. 5 depicts a volume of fuel dispensed into a green tank during a virgin filling event at plot 502, a variable dispense rate at plot 504, and a corresponding change in fuel tank pressure at plot 506. All plots are depicted over time. In addition, it is assumed that the temperature remains constant over time (e.g., the temperature remains at 55° F.).

At t1, a first ever fuel tank filling event is initiated with a corresponding rise in fuel tank volume (plot 502). As such, fuel may never have been dispensed into the fuel tank before this fill event. The volume is dispensed initially at a first lower dispense rate (e.g., 5 GPM) between t1 and t2, and then at a second higher dispense rate (e.g., 12 GPM) between t2 and t3. Due to the presence of only air in the fuel tank when fueling is initiated, shortly after t1, a first spike in fuel tank pressure (e.g., to 9 InH2O) is observed. Then, shortly after t2, when the dispense rate is increased, a second spike in fuel tank pressure (e.g., to 21 InH2O) is observed. The noise energy associated with the positive pressure spikes at the first fill event of the fuel tank is leveraged, along with the motion of the vehicle along the assembly line with the engine off, to diagnose a fine leak without adding cycle time.

Returning to FIG. 2, fuel may continue to be added to the fuel tank during the first fill event until a threshold pressure is reached. Alternatively, fuel may continue to be added until a threshold fill level corresponding to the threshold pressure is reached. As the pressure rises in the fuel tank, it may be determined if the fuel level has reached a fuel level threshold at 216. The threshold may be based on a target fuel tank pressure at the sealing, with the threshold level adjusted to provide a target fuel system pressure (e.g., fuel tank pressure) that enables reliable detection of a fuel system orifice that is smaller than a threshold size. In one example, the threshold fill level may include 15-20% of fuel. If the fuel level in the fuel tank is not above the threshold fuel level, routine 200 continues to add fuel to the fuel tank at 218 until the threshold fill level is reached.

If the fill level of the fuel tank is above the threshold fill level, it may be inferred that the fuel tank pressure has exceeded the threshold pressure. At 220, once the threshold fill level (or threshold fuel system pressure) is reached, further dispensing of fuel into the fuel tank is terminated. As elaborated below, this "noise" energy (or elevated fuel tank pressure) from the fuel flashing in the green tank may then be advantageously used to perform a fine leak detection (such as detection of an orifice having a smaller than threshold size, such as in the range of 0.02") while the vehicle is moving on an assembly line conveyor.

At 222, the canister vent valve (such as CVV 114 of FIG. 1) is actuated closed to seal the fuel tank from the atmosphere, thereby trapping the pressure built up inside of the fuel tank. As an example, the controller may send a signal to a canister vent solenoid to actuate the vent valve closed. Furthermore, the vehicle is moved down the assembly line, away from the fueling station. In response to a closure of the CVV, an EONV leak test is initiated. The EONV test then continues as the vehicle moves along the assembly line with the engine shutdown.

As such, EONV tests typically require a significant amount of heat rejection from the engine to the fuel tank and a long run time to diagnose fine leaks. Due to cycle time limitations at EOL stations of an assembly plant, there may not be enough time to diagnose a fine leak. For example, a gross leak test may complete an entire bleed-up phase in less than 10 seconds while the entire bleed-up phase of the fine leak test may require 1-3 minutes. Some assembly plants run 90 jobs/hour, and long EONV leak tests at a given EOL station could result in back-up of vehicles on the moving assembly line. In addition, the limited engine run time at the assembly plant does not generate sufficient heat rejection (which is typically based on total air mass consumed by the engine, miles driven, engine run time, etc.). Consequently, a medium or gross leak test may be completed with the engine running and fine leak detection with the engine off may remain incomplete.

With the initiation of the EONV test, at 224, the vehicle is moved to the next location on the assembly line (e.g., from the first station to a second station). As such, the second station is not selected based on the leak test. On the contrary, the second station is based on the assembly line configuration and order of vehicle assembly, and is independent of the leak test. As elaborated herein, the time elapsed during the usual passage of the shutdown engine along different stations of an assembly line is leveraged to perform the fine leak test. The vehicle is moved along a conveyor belt via a vehicle controller, wherein the controller includes instructions for moving the vehicle through one or more stations of the assembly plant while moving the vehicle from the first station to the second station. As the vehicle moves on the conveyor, through locations along the assembly line, the change in fuel tank pressure is continually monitored at 226. The EONV test may continue until the vehicle reaches a station where the engine has to be started for the first time in the drive history of the vehicle. As such there may be a considerable distance between the fueling station on the moving assembly line and the first EOL station where the vehicle engine is cranked and a first ever combustion event of the engine is performed, and then driven off the assembly line to the dynamometer rolls. For example, the transition from the fueling station to the station where the engine is started for the first time and a first combustion event (with no prior combustion event) of the engine is performed may take a significant amount of time, such as a couple of minutes (e.g., 3 minutes). This may be sufficient time for an EONV based fine leak test to be reliably completed. By performing the EONV test while the vehicle continues to move along the assembly line, the test is completed in the background without adding any cycle time. In addition, the test is completed even before the first combustion event of the engine occurs. The rate at which the pressure changes at the fuel tank as the vehicle moves along the assembly line may then be monitored to identify fuel system degradation, such as the presence of fine leaks in the fuel system.

At 228, it may be determined if the vehicle is at an End of Line (EOL) static station. As such, the EOL station may be a station where the vehicle engine is started for the first time. If it is determined that the vehicle is not yet at the EOL station, at 229 the routine includes continuing moving the vehicle along the assembly line while monitoring the fuel tank pressure. If it is determined that the vehicle has arrived at the EOL station, at 230, monitoring of the fuel tank pressure may be terminated. In addition, the fuel tank is unsealed by opening the purge valve and the vent valve, and the engine is cranked and started by initiating cylinder fuel injection and cylinder fuel combustion. A first ever combustion event of the engine is then performed. It will be noted that the filling of the green fuel tank and the first engine combustion event during the first engine start occur at different stations of the assembly plant. This allows the leak test to be completed before the first ever combustion event from initial engine assembly occurs.

After the EONV leak test is terminated, responsive to the arrival of the vehicle at a station where the engine is to be cranked for the first time, and a first combustion event of the engine is to be performed, a pass/not pass decision is made. At 232, the fuel tank pressure data collected from the time the fuel tank was sealed (at 222, following the first fill event of the green tank at the first, fueling station) to the time the fuel tank is unsealed (at 230, at the first combustion event of the engine at the second EOL station) may be retrieved and assessed. Further, the rate of change of the monitored pressure may be compared to a threshold rate. As such, the pressure of the isolated fuel tank may be expected to equilibrate back (herein, bleed-down) towards atmospheric pressure at a defined rate (based on a reference orifice size). For example, the positive pressure of the fuel system may be expected to hold and bleed-down slowly in the absence of any leaks. If the rate of change of monitored pressure between the first station and the second station is determined to be higher than the threshold rate, then at 236, then it may be indicated that the fine leak test did not pass. Thus following application of the positive pressure via the first filling event of the fuel tank, a faster than threshold rate of change in fuel tank pressure may be used to infer a fuel system degradation including a smaller than threshold sized orifice. Fuel system degradation may then be indicated by setting a diagnostic code representing the presence of a fine leak (e.g., by setting a corresponding malfunction indication light). Since the transition from the first station to the second station occurs over a longer amount of time, an EONV test identifying a fine fuel system leak may be reliably completed as the vehicle moves from the first station to the second station. By performing the EONV test while the vehicle continues to move along the assembly line, a fine leak test is completed without adding any cycle time. For example, instead of having to detect fine leaks less reliably in 10 seconds while waiting at an EOL station of an assembly plant, the method of FIG. 2 enables a fine leak to be reliably detected during vehicle transit on the moving conveyor, post the first fill event using the green tank pressure, in 1-3 minutes.

It will be appreciated that the EONV fine leak test is performed only after the first fill event of the fuel tank following vehicle assembly, as the vehicle moves along an assembly line.

In this way, at the second station, the presence of a smaller than threshold orifice in the fuel system may be identified based on the rate of pressure bleed-down of the monitored fuel tank pressure. The orifice size of the leak may then be determined based on a difference between the absolute rate of change in the fuel system pressure and the threshold rate. For example, as the difference increases, a larger orifice size of the leak may be indicated. As used herein, the rate of change may be an absolute rate of change in the fuel tank (positive) pressure. Alternatively, fuel system degradation may be confirmed based on a final resting fuel tank pressure at the time of starting the engine. If the difference between the final pressure of the fuel tank relative to the fuel tank pressure after filling the green tank is higher than a threshold difference, a fine leak (such as a 0.02" leak) may be confirmed. Thus a 0.02" leak may be detected during vehicle transit following a first fuel tank filling event since vehicle assembly.

If a 0.02" leak is present, the monitored fuel tank pressure may be expected to bleed-down to the atmospheric pressure at a faster rate, i.e., greater than the threshold, over the given period of time. The given period of time may be determined by the amount of time and distance at the plant between the first station and the second station. As the vehicle moves from station to station on the assembly line, a period of time elapses between the fueling station and the EOL station. Routine 200 utilizes this time elapsed between the vehicle being at the fueling station of the assembly plant and EOL station of the assembly plant to perform the fine leak (e.g., 0.02" leak) detection test. In this way, a fine leak test may be completed in the limited time available at the assembly plant despite the larger amount of time required for fine leak test completion.

If fuel system degradation is indicated, and a fine leak is confirmed, at 238, the vehicle is moved to a next location in the assembly plant the location based on the indication of degradation. For example, the next location may be a third station, or final station along the assembly line, where the vehicle is repaired and from where vehicle delivery to a customer is delayed.

In comparison, in response to the rate of change of monitored pressure, or pressure bleed-down, between the first station and the second station being lower than the threshold rate at 232, (that is, if following application of the positive pressure, the rate of change in fuel tank pressure is slower than the threshold rate), no fuel system degradation may be determined based on the EONV leak test. In addition, the absence of a fine leak is indicated at 234. At 240, the vehicle is moved to the next location in the plant. For example, the next location may be a fourth station where the vehicle is assessed for the presence of a gross leak by performing a quicker engine running leak test, as elaborated with reference to FIG. 3. The fourth station may alternatively be a final station along the assembly line, from where vehicle delivery to a customer is expedited. Routine 200 may then end.

In this way, at a first fuel tank filling event while a vehicle is on an assembly line, with no prior filling event, the fuel tank may be filled to a threshold level. Thereafter the fuel tank may be sealed and degradation of a fuel system may be indicated based on a change in fuel tank pressure while the vehicle moves along the assembly line, before the engine of the vehicle is operated for a first time since assembly.

FIG. 3 shows a high level flow chart illustrating an example routine that may be implemented for performing one or more leak detection tests including an engine-off natural vacuum (EONV) test performed with the engine off after the vehicle has been delivered to a customer, and an engine running test performed at an end of line station of the assembly plant with the engine running. The EONV test may be used for identifying a fine leak after the vehicle has been delivered while the engine running test may be used for identifying a gross leak in a vehicle moving through an assembly plant, following the fine leak detection test of FIG. 2. For example, the gross leak test of routine 300 may take place at an End of Line (EOL) static station at the assembly plant. As such, the gross leak test of FIG. 3 is a shorter and quicker test that is easily performed within the time constraints at the assembly plant. The gross leak test includes the application of intake manifold vacuum on a fuel system during a vacuum pulldown phase, and a subsequent pressure bleed-up phase that monitors the rate of vacuum dissipation in a sealed fuel system. The EONV leak test of FIG. 3, like the EONV leak test of FIG. 2, is a longer test that is intermittently performed after vehicle delivery to ensure vehicle emissions are in a target range.

Routine 300 begins at 302 with determining whether an engine-off event has occurred after the vehicle has left the assembly plant. For example, it may be determined if EONV test conditions have been met after the vehicle has left the assembly plant. As such, an engine off event may occur intermittently during vehicle operation and an EONV test may be opportunistically performed.

If an engine-off event has not occurred or if the vehicle has not left the assembly plant, the routine moves to 303 where it is determined if gross leak test conditions have been met. In one example, gross leak test conditions may be considered met if the vehicle is at an end of line station of the assembly plant after having completed a fine leak test earlier. For example, the vehicle may have been assessed for fine leaks between a first station and a second station of the assembly plant, while the vehicle may be assessed for gross leaks upon arrival at the second station of the assembly plant. In another example, gross leak test conditions may be considered met after the vehicle has left the assembly plant if a threshold duration or distance of vehicle travel has elapsed since a last iteration of the gross leak test. In yet another example, gross leak test conditions may be considered met after a first ever combustion event of the engine has occurred since vehicle assembly. As such, the gross leak test may require the engine to be running.

If gross leak test conditions are not met, then at 305, the method includes retrying the engine-off and/or engine running leak tests when the corresponding conditions are met. That is, performing of the gross leak test may be delayed at the present time while the one or more other leak tests are opportunistically performed.

If an engine-off event has occurred after the vehicle has left the assembly plant, at 306 the method includes closing the canister vent valve (CVV) to isolate the fuel tank from atmosphere. At 308, a canister purge valve (CPV) may be maintained open. As a result of closing the vent valve, after the engine-off, as the fuel tank starts to cool, a fuel tank pressure starts to drop and a natural vacuum starts to form in the fuel tank. As such, this constitutes a vacuum pull-down phase of the EONV leak test through the application of a negative pressure within the fuel system.

At 310, it may be determined if the fuel tank pressure (more specifically the fuel tank vacuum) has reached a threshold level. For example, it may be determined if a target vacuum level has been reached. The threshold vacuum may be based on current vehicle operating conditions, including the ambient temperature, the ambient pressure, the fuel level in the fuel tank, as well as the volatility or octane rating of the fuel in the fuel tank. In one example, the target vacuum is −8 InH2O.

At 312, in response to the fuel tank pressure reaching the target vacuum, the CPV is closed, sealing the fuel tank from the engine. At this time, the fuel tank is sealed from both the atmosphere via the CVV and the engine intake via the CPV. If there is no fuel system degradation (e.g., no leaks), then the applied vacuum is expected to hold, dissipating at a slow rate based on a size of a reference orifice of the fuel system. Thereafter, a bleed-up phase of the test is initiated where a rate of pressure bleed-up to atmospheric conditions is monitored. In one example, where the vehicle has left the assembly plant and the leak test s an EONV leak test, the bleed-up phase may be relatively long, for example lasting 3 minutes or more.

At 314, it may be determined if the rate of fuel tank pressure bleed-up in the sealed fuel system is higher than a threshold rate. If it is determined that the rate of pressure bleed-up did not exceed the threshold, routine 300 continues to 324 to indicate no fuel system degradation and the absence of leaks. In addition, the controller may record a passing leak test result. In comparison, if the rate of pressure bleed-up did exceed the threshold, the routine 300 continues to 320 to indicate fuel system degradation and the presence of leaks. In addition, based on the rate of pressure bleed-up relative to the threshold rate, a degree of fuel system degradation and a size of an orifice in the fuel system may be inferred. At 322, a diagnostic code (e.g., an MIL) may be set to indicate the presence of a fuel system leak. From each of 324 and 326, upon completion of the leak test, the method moves to 326 to open the CVV, thereby unsealing the fuel system from the atmosphere. In addition, the CPV may be opened, unsealing the fuel system from the engine intake.

If the target vacuum is not reached at 310, it may be inferred that vacuum is not developing in the sealed fuel tank. In one example, the fuel tank pressure may not reach the target vacuum due to the presence of a leak. To confirm, at 316 it may be determined if a threshold duration has elapsed since the engine-off event (or since the initiation of the leak test). In one example, the vacuum may not have reached the target vacuum level due to a sufficient amount of time not having elapsed. The threshold duration required for the vacuum to be reliably generated in the fuel tank may be based on the ambient temperature. For example, a longer time may be required to generate the natural vacuum due to slower heat rejection from the fuel tank. If not accounted for, the insufficient vacuum generation may be learned as a false negative in the pull-down phase of the leak test. Therefore, if it is determined that the threshold duration had not elapsed, routine 300 moves to 318 to continue monitoring the fuel tank pressure drop. If it is determined that the threshold duration has elapsed and the target vacuum has still not been generated in the fuel system, the method moves to 320 to indicate that the EONV test did not pass. In addition, at 322, fuel system degradation may be indicated by setting a diagnostic code (e.g., by setting a malfunction indication light). Thereafter, at 326, the CVV may be reopened to allow the fuel tank to equilibrate back towards atmospheric pressure.

Returning to 303, if (engine running) gross leak test conditions are met, then at 304, the method includes opening the CPV while the engine is running to apply engine intake manifold vacuum (generated during engine operation with natural aspiration) on the fuel system. Manifold vacuum may continue to be applied while the engine is running until the target vacuum level is reached, as previously discussed at 310. As such, the application of the manifold vacuum responsive to the gross leak test conditions being met may be initiated or performed at an end of line station of the assembly plant, such as at a second station distinct from a first station where a fine leak test is initiated.

Once the target vacuum level is reached, the CPV is closed to seal the fuel system from the engine intake, thereby disabling further application of engine manifold vacuum on the fuel system. In addition, the CVV is closed to seal the fuel system from the atmosphere. At this time, the fuel tank is a sealed fuel system. Thereafter, a bleed-up phase of the gross leak test is initiated where a rate of pressure bleed-up to atmospheric conditions is monitored. In one example, where the vehicle is still in the assembly plant and the leak test is a gross leak test, the bleed-up phase may be relatively short, for example lasting 10 seconds or less. As time is of the essence at the EOL station, the shorter bleed-up phase may be long enough to allow for the detection of gross leaks, such as those with an orifice that is greater than or equal to 0.04".

At 314, it may be determined if the rate of fuel tank pressure bleed-up in the sealed fuel system is higher than a threshold rate in the short bleed-up phase time. If it is determined that the rate of pressure bleed-up did not exceed the threshold, routine 300 continues to 324 to indicate no fuel system degradation and the absence of gross leaks. In addition, the controller may record a passing gross leak test result. In comparison, if the rate of pressure bleed-up does exceed the threshold, the routine 300 continues to 320 to indicate fuel system degradation and the presence of gross leaks. In addition, based on the rate of pressure bleed-up relative to the threshold rate, a degree of fuel system degradation and a size of an orifice in the fuel system may be inferred. At 322, a diagnostic code (e.g., an MIL) may be set to indicate the presence of a fuel system gross leak. From each of 324 and 326, upon completion of the leak test, the method moves to 326 to open the CVV, thereby unsealing the fuel system from the atmosphere. In addition, the CPV may be opened, unsealing the fuel system from the engine intake.

If the target vacuum is not reached at 310, the method moves to 316 to determine if a threshold duration has elapsed since the closing of the CPV and the initiation of the gross leak test. If it is determined that the threshold duration had not elapsed, at 318 the controller continues monitoring the fuel tank pressure drop. If it is determined that the threshold duration has elapsed and the target vacuum has still not been generated in the fuel system, the method moves to 320 to indicate that the gross leak test did not pass. In addition, at 322, fuel system degradation may be indicated by setting a diagnostic code (e.g., by setting a malfunction indication light). Thereafter, at 326, the CVV may be reopened to allow the fuel tank to equilibrate back towards atmospheric pressure.

In one example, responsive to the indication of no fuel system degradation following the gross leak test, the vehicle may be moved to a third station from where the vehicle can be delivered to a customer. Else, responsive to the indication of fuel system degradation following the gross leak test, the vehicle may be moved to a fourth, different station where the vehicle is retained and from where delivery to a customer is delayed.

In one example, where a fine and a gross leak test are performed while the vehicle is in an assembly plant, the fine leak test may be performed with the engine off as the vehicle travels along the assembly line from a first station (where it is refueled for the first time) to a second station (where it is cranked for the first time). In comparison, the gross leak test may be performed with the engine running while being held (static) at a fourth station. Herein, the duration of holding the vehicle at the fourth station to complete the gross leak test may be shorter than the duration of vehicle travel along the assembly line from the first station to the second station to complete the fine leak test.

It will be appreciated that while the routine of FIGS. 2-3 depicts detecting fine leaks using EONV methods while at the assembly plant, this is not meant to be limiting. In alternate examples, fine leaks may detected at the assembly plant relying on natural cooling from a diurnal temperature cycle. As such, fine evaporative emissions may be detected through one or more methods including EONV (which may include pressure build from heat rejection or vacuum build from diurnal temperature cooling), diurnal Cycle Methods (e.g., Conti NVLD II which includes a calibrated vacuum switch closure from diurnal cooling to indicate a leak free system), and an Active Pump method (e.g., using an ELCM active vacuum pump with calibrated 0.02" orifice). As discussed earlier, EONV may not be able to run and finish at the EOL stations of the assembly plant due to lack of sufficient engine-on time as well as cycle time limitations. In some examples, the vacuum phase of EONV (which relies on natural cooling from the environment) or the diurnal cycle cooling system (NVLD II) could be used inside an assembly plant. However, in plants having climate controlled environments, the climate control may nullify the diurnal temperature cooling effect. In such cases, use of the positive pressure from the green effect of the first tank filling event may be advantageously leveraged to complete fine leak detection FIG. 4 shows an example timeline for performing evaporative emissions tests for a fuel tank delivering fuel to an engine, while a vehicle is at an assembly plant. Timeline 400 includes plot 405 indicating the location of a vehicle in an assembly plant over time (in relation to one or more stations), plot 409 (solid line) indicating the pressure inside the fuel tank as the vehicle moves through the assembly line, plot 415 indicating the fill level of the fuel tank as output by a fuel level indicator or fuel level sensor, plot 420 indicating the state (open or closed) of a canister vent valve (CVV) coupling the fuel system to atmosphere, and plot 425 indicating whether an engine of the vehicle is being run or not. The vehicle may proceed through stations A-E along the assembly line, based on pre-determined vehicle manufacturing requirements.

Prior to t1, the vehicle is at a first station (station A) of the assembly line (plot 405). In this example, station A may be any station in vehicle production preceding a second fueling station (station B). The fuel tank pressure (plot 409) at this time is zero as fuel has not been introduced to the fuel tank (plot 415) since vehicle assembly, thus indicating it is a green fuel tank. The CVV may be closed (plot 420) at this time. Alternatively, the CVV may be open.

At t1, the vehicle arrives at station B (plot 405) for a very first virgin filling event. As such, fuel may never have been introduced into the fuel tank prior to this fill event, and therefore prior to t1, the fuel tank may be filled with air. Responsive to the vehicle arriving at the fueling station, the CVV is commanded open (plot 415) by sending a signal from the controller to a solenoid of the CVV. By opening the CVV, the fuel system is coupled to the atmosphere.

Between t1 and t2, an initial filling event of the fuel tank, with no prior fuel tank filling, takes place at station B (plot 405). As the fuel level in the fuel tank starts to rise (plot 415), the fuel tank pressure begins to rise due to a green tank effect wherein fuel flashes as soon as it hits the air-filled fuel tank. Specifically, when fuel is dispensed into the virgin fuel tank full of air, the cooled sprayed fuel instantly flashes, generating high fuel tank pressure. In this example, when the fuel tank contains 15-20% of fuel, the fuel tank contains a sufficiently high fuel tank pressure which can be advantageously used to determine the presence of a fine leak while the vehicle is still on the assembly line. The CVV remains open allowing fueling vapors to be trapped in a canister coupled to the fuel tank (plot 420) before the vapors are released to the atmosphere.

At t2, the fuel tank pressure reaches threshold pressure Thr_1 (plot 409), based on the fuel level in the fuel tank reaching Thr_2 (plot 415). Responsive to the threshold fuel tank pressure being reached, it may be determined that there is adequate (positive) pressure in the fuel tank to initiate a first leak test to identify fine leaks, herein configured as an EONV leak detection test, for the vehicle while still on the assembly line. Therefore, further filling of fuel into the fuel tank is terminated. In addition, the CVV is commanded closed (plot 420), sealing the fuel tank from the atmosphere in preparation of the first EONV based leak detection test. Also responsive to completion of the filling event, the vehicle exits station B (plot 405) and is moved along the assembly line towards station C. As such, the vehicle moves from station B to station C over a long duration of time (or long distance), depicted here as t1-t2. It will be appreciated that the vehicle may move through one or a plurality of stations of the assembly plant between while en route from station B to station C.

Between t2 and t3, as the vehicle moves to station C (plot 405), a bleed-down of fuel tank pressure is monitored. In the absence of a leak, the fuel tank pressure may bleed down at a slower rate (e.g., slower than a threshold rate), as shown in plot 409 (solid line). However, in the presence of a fine leak, the fuel tank pressure may bleed down at a faster rate (e.g., faster than a threshold rate), over the long duration, as shown by dashed line 407. As such, degradation of the fuel system is indicated based on a rate of pressure bleed-down from the target pressure in the presence of a smaller orifice. In response to a leak being detected responsive to a higher than threshold rate of pressure change, fuel system degradation may be indicated by setting a diagnostic code.

At t3, upon reaching station C, it is determined that the engine is to be cranked for a very first time so that a first combustion event, with no prior combustion event, can be performed in the engine after vehicle assembly (plot 425). Responsive to the first combustion event of the engine being commanded, the leak detection test may be terminated and the CVV may be opened. In addition, the fuel tank pressure data collected between t1 and t2 is retrieved and assessed. In the present example, the rate of pressure bleed-down from the target pressure is lower than the threshold, indicating the absence of fine leaks in the fuel system. In this way, a first fine leak detection test may be performed as the vehicle moves towards (and through) station C, reducing cycle times by avoiding additional steps being added to the assembly line. In particular, a span of time spent on the assembly line can be advantageously used to perform a fine leak detection test that may have otherwise been omitted due to time constraints. As a result, a finer leak indicating an orifice of a first diameter (e.g., 0.02" leak) may be detected during vehicle transit following the first filling event, thereby saving time, resources, maintenance costs, as well as reducing premature service warranty issues. Following the first combustion event, the vehicle spends an amount of time (t3-t4) at station C before moving the vehicle from station C to station D.

At t4, while the engine is still running, the vehicle arrives at station D (plot 405), an End of Line (EOL) station. At this point in the assembly line, the fuel system is run through an Engine-running leak test to further test for the presence of gross leaks. This test is composed of three phases: a vacuum pulldown phase, a bleed-up phase, and a vent phase. The bleed-up phase determines the presence of leaks exceeding the size orifice of 0.04" or greater. In contrast to the prior fine leak detection test using engine-off natural vacuum, the bleed-up phase of the gross leak test occurs over a shorter period of time (herein from t5 to t6, which may be less than ten seconds, and which is less than the bleed-down phase of the EONV test from t2 to t3). Responsive to the arrival at the EOL station, a canister purge valve (not shown) is commanded open to apply intake manifold vacuum from the running engine to the fuel system.

Between t4 and t5, the fuel tank pressure is reduced due to the application of engine intake vacuum. At t5, after reaching a threshold vacuum level, application of negative pressure is discontinued by closing the CPV and the CVV to seal the fuel system from the engine and the atmosphere. As a result, at t5, the vehicle fuel system enters the bleed-up phase wherein, following the application of the negative pressure, a change in the fuel tank vacuum is monitored from t5 to t6. In the absence of a leak, the fuel tank pressure may bleed up at a slower rate (e.g., slower than a threshold rate), and stabilize at a lower pressure value (e.g., at or below a reference value), as shown by plot 409 (solid line). However, in the presence of a leak (e.g., greater than 0.04"), the pressure may bleed up at a faster rate (e.g., faster than a threshold rate), and stabilize at a higher pressure value (e.g., above a reference value), as shown by dashed line 410. As such, the presence of an orifice having a second diameter, larger than the first diameter, is indicated in the fuel system based on a rate of fuel tank pressure bleed-up following the isolating in the shorter duration t5-t6. In response to a leak being detected, fuel system degradation is indicated by setting a diagnostic code. In the present example, the rate of pressure bleed-down from the target pressure is lower than the threshold, indicating the absence of fine leaks in the fuel system.

At t6, the CVV and the CPV are opened and responsive to no indication of fuel system degradation, the vehicle is moved to a final station E from where vehicle delivery is expedited.

Thus, as the vehicle moves through an assembly line, during a virgin filling event, positive pressure is generated as fuel enters the green fuel tank while during an engine running leak test, negative pressure is applied on the fuel system. During both events along the assembly line, fuel system degradation may be indicated in response to a change in fuel system pressure following application of pressure. Specifically, following the virgin fueling event, the application of positive pressure may be used to determine the presence of a finer leak as the vehicle moves from station to station while following a virgin combustion event, the application of negative pressure may be used to determine the presence of a larger leak as the vehicle is held at a station.

In this way, existing vehicle assembly operations (e.g., a first filling event of a fuel tank at an assembly plant following vehicle assembly) can be used to opportunistically perform fuel system leak tests that require long run times. Specifically, by monitoring the change in fuel tank pressure as the vehicle moves along the assembly line following the first ever fill event, a fine leak detection may be completed without adding cycle time to any end of line (EOL) station of the assembly plant. By leveraging the large pressure generated at the first fill event, the need for a pressure pump to enable leak detection is reduced. By enabling fine leak test completion despite the limited time availability at the assembly plant, low mileage warranty issues for vehicle leaving the assembly plant are reduced. In addition, evaporative emissions quality of the vehicle leaving the plant is improved.

One example method comprises: on only a first initial fuel tank filling event while a vehicle is on an assembly line, with no prior fuel filling event, filling the fuel tank to a threshold level and sealing the fuel tank; and indicating degradation of a fuel system based on a change in fuel tank pressure while the vehicle moves along the assembly line. In the preceding example, additionally or optionally, the first initial fuel tank filling event is a first filling event from an initial assembly of the vehicle, and the threshold level is based on a target fuel tank pressure at the sealing. In any or all of the preceding examples, additionally or optionally, sealing the fuel tank includes sealing the fuel tank from atmosphere by closing a vent valve of the fuel system, and sealing the fuel tank from an engine by closing a purge valve of the fuel system. In any or all of the preceding examples, additionally or optionally, the engine is maintained shutdown during the fuel tank filling event and while the vehicle moves along the assembly line. In any or all of the preceding examples, additionally or optionally, filling the fuel tank is performed at a first station of the assembly line, the method further comprising, in response to the vehicle arriving at a second, different station of the assembly line, unsealing the fuel tank by opening the purge valve and the vent valve, and performing a first combustion event in the engine since the initial assembly of the vehicle. In any or all of the preceding examples, additionally or optionally, the indicating includes: in response to a rate of pressure bleed-down between the first station and the second station being higher than a threshold, indicating degradation of the fuel system; and in response to the rate of pressure bleed-down between the first station and the second station being lower than the threshold, indicating no degradation of the fuel system. In any or all of the preceding examples, additionally or optionally, the method further comprises, responsive to the indication of degradation of the fuel system, setting a diagnostic code and moving the vehicle along the assembly line to a third station where vehicle delivery to a customer is delayed; and responsive to the indication of no degradation of the fuel system, moving the vehicle along the assembly line to a fourth station where vehicle delivery to a customer is expedited. In any or all of the preceding examples, additionally or optionally, the method further comprises: while holding the vehicle at the fourth station, with the engine combusting fuel, applying an engine intake vacuum on the fuel tank by opening the purge valve; sealing the fuel tank from the engine and the atmosphere responsive to fuel tank pressure being lower than a threshold pressure; and indicating degradation of the fuel system based on a rate of pressure bleed-up from the threshold pressure being higher than a threshold rate. In any or all of the preceding examples, additionally or optionally, indicating degradation of the fuel system based on a rate of pressure bleed-up from the threshold pressure includes indicating presence of a larger orifice; and wherein indicating degradation of the fuel system based on a rate of pressure bleed-down from the target pressure includes indicating presence of a smaller orifice. In any or all of the preceding examples, additionally or optionally, a duration of holding the vehicle at the fourth station is shorter than the duration of vehicle travel along the assembly line from the first station to the second station. In any or all of the preceding examples, additionally or optionally, a final fuel tank pressure at the second station being higher than an ambient pressure, indicating degradation of the fuel system; and in response to the final tank pressure at the second station being lower than the threshold pressure, indicating no degradation of the fuel system. In any or all of the preceding examples, additionally or optionally, Another example method for a fuel system of a vehicle, comprises: filling fuel for a first time in a green fuel tank following vehicle assembly at an assembly plant, with no prior fuel tank filling; sealing the fuel tank and monitoring a change in fuel tank pressure as the vehicle moves along stations at an assembly plant with the engine shutdown; and responsive to commanding of a first combustion event in the engine since the vehicle assembly, unsealing the fuel tank and indicating degradation of a fuel system based on the monitored change in fuel tank pressure being faster than a threshold rate. In the preceding example, additionally or optionally, filling fuel for the first time in the green tank includes the fuel tank being filled to a threshold level, the threshold level adjusted to provide a target fuel tank pressure that enables detection of a fuel system orifice that is smaller than a threshold size. In any or all of the preceding examples, additionally or optionally, the filling of the green fuel tank and the first combustion event in the engine occur at different stations of the assembly plant. In any or all of the preceding examples, additionally or optionally, the indicating degradation is completed before completion of the first combustion event in the engine. In any or all of the preceding examples, additionally or optionally, the fuel system includes a fuel tank coupled to a fuel canister, the canister coupled to the engine via a purge valve and further coupled to atmosphere via a vent valve, and wherein sealing the fuel tank includes closing each of the vent valve and the purge valve to seal the fuel tank from each of the engine and the atmosphere, and wherein unsealing the fuel tank includes opening the vent valve. In any or all of the preceding examples, additionally or optionally, the method further comprises selecting a final station for the vehicle at the assembly plant based on the indication of degradation.

Another example vehicle system, comprises: a vehicle including an engine; a fuel system including a fuel tank, a canister, a purge valve coupling the canister to the engine, and a vent valve coupling the canister to atmosphere; a pressure sensor coupled to the fuel tank; a controller including computer readable instructions stored on non-transitory memory for: moving the vehicle, on a conveyor, between stations of an assembly plant; at a first station, following assembly of the vehicle and with the engine shutdown, refilling the fuel tank to a threshold level on a first fueling event in a fueling history of the fuel tank; then isolating the fuel tank from atmosphere by closing the vent valve; monitoring fuel tank pressure as the vehicle moves along the conveyor from the first station to a second station; and at the second station, indicating the presence of an orifice in the fuel system based on a rate of pressure bleed-down of the monitored fuel tank pressure. In any or all of the preceding examples, additionally or optionally, the controller includes further instructions for: moving the vehicle through one or more stations of the assembly plant when moving the vehicle from the first station to the second station. In any or all of the preceding examples, additionally or optionally, the orifice has a first diameter, and wherein the controller includes further instructions for: moving the vehicle from the second station to a third station; at the third station, applying an engine vacuum on the fuel tank; then isolating the fuel tank from atmosphere; and indicating the presence of an orifice having a second diameter, larger than the first diameter, in the fuel system based on a rate of fuel tank pressure bleed-up following the isolating.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   filling a fully air-filled fuel tank with fuel for a first time since vehicle assembly at a first station;
   sealing the fuel tank;
   monitoring fuel tank pressure prior to cranking an engine;
   indicating degradation of a fuel system based on a change in the monitored fuel tank pressure; and
   performing a first combustion event in the engine since the initial assembly of the vehicle at a second station.

2. The method of claim 1, wherein the fuel tank is filled to a threshold level, the threshold level based on a target fuel tank pressure at the sealing.

3. The method of claim 1, wherein sealing the fuel tank includes sealing the fuel tank from atmosphere by closing a vent valve of the fuel system, and sealing the fuel tank from the engine by closing a purge valve of the fuel system.

4. The method of claim 3, wherein the engine is maintained shutdown during a fuel tank filling event and while the vehicle moves along an assembly line.

5. The method of claim 4, the method further comprising, in response to the vehicle arriving at the second station, unsealing the fuel tank by opening the purge valve and the vent valve, and performing the first combustion event in the engine since the initial assembly of the vehicle.

6. The method of claim 5, wherein the indicating includes:
   in response to a rate of pressure bleed-down between the first station and the second station being higher than a threshold, indicating degradation of the fuel system; and
   in response to the rate of pressure bleed-down between the first station and the second station being lower than the threshold, indicating no degradation of the fuel system.

7. The method of claim 6, further comprising, responsive to the indication of degradation of the fuel system, setting a diagnostic code and moving the vehicle along the assembly line to a third station where vehicle delivery to a customer is delayed; and, responsive to the indication of no degradation of the fuel system, moving the vehicle along the assembly line to a fourth station where vehicle delivery to the customer is expedited.

8. The method of claim 7, further comprising:
   while holding the vehicle at the fourth station, with the engine combusting fuel,
      applying an engine intake vacuum on the fuel tank by opening the purge valve;
      sealing the fuel tank from the engine and atmosphere responsive to the monitored fuel tank pressure being lower than a threshold pressure; and
      indicating degradation of the fuel system based on a rate of pressure bleed-up from the threshold pressure being higher than a threshold rate.

9. The method of claim 8, wherein indicating degradation of the fuel system based on the rate of pressure bleed-up from the threshold pressure includes indicating presence of a larger orifice, and wherein indicating degradation of the fuel system based on a rate of pressure bleed-down from the target pressure includes indicating presence of a smaller orifice.

10. The method of claim 8, wherein a duration of holding the vehicle at the fourth station is shorter than a duration of vehicle travel along the assembly line from the first station to the second station.

11. The method of claim 5, wherein the indicating includes:
   in response to a final fuel tank pressure at the second station being higher than a threshold pressure, indicating degradation of the fuel system; and
   in response to the final fuel tank pressure at the second station being lower than the threshold pressure, indicating no degradation of the fuel system.

12. A method for a fuel system of a vehicle, comprising:
   filling fuel for a first time in a green fuel tank following vehicle assembly at an assembly plant, with no prior fuel tank filling;
   sealing the fuel tank and monitoring a change in fuel tank pressure as the vehicle moves along stations at the assembly plant with the engine shutdown; and
   responsive to commanding of a first combustion event in the engine since the vehicle assembly,
      unsealing the fuel tank and indicating degradation of a fuel system based on the monitored change in fuel tank pressure being faster than a threshold rate.

13. The method of claim 12, wherein filling fuel for the first time in the green fuel tank includes the fuel tank being filled to a threshold level, the threshold level adjusted to provide a target fuel tank pressure that enables detection of a fuel system orifice that is smaller than a threshold size.

14. The method of claim 12, wherein the filling of the green fuel tank and the first combustion event in the engine occur at different stations of the assembly plant.

15. The method of claim 12, wherein the indicating degradation is completed before completion of the first combustion event in the engine.

16. The method of claim 12, wherein the fuel system includes a fuel tank coupled to a fuel canister, the canister coupled to the engine via a purge valve and further coupled to atmosphere via a vent valve, and wherein sealing the fuel tank includes closing each of the vent valve and the purge valve to seal the fuel tank from each of the engine and atmosphere, and wherein unsealing the fuel tank includes opening the vent valve.

17. The method of claim 12, further comprising selecting a final station for the vehicle at the assembly plant based on the indication of degradation.

18. A vehicle system, comprising:
a vehicle including an engine;
a fuel system including a fuel tank, a canister, a purge valve coupling the canister to the engine, and a vent valve coupling the canister to atmosphere;
a pressure sensor coupled to the fuel tank; and
a controller including computer readable instructions stored on non-transitory memory for performing a fuel system leak test on a vehicle as it moves between stations of an assembly plant and before a first combustion event in the engine, comprising:
at a first station, filling the fuel tank to a threshold level on a first filling event in a fill history of the fuel tank;
isolating the fuel tank from atmosphere by closing the vent valve;
monitoring fuel tank pressure as the vehicle moves along a conveyor from the first station to a second station;
indicating the presence of an orifice in the fuel system based on a rate of pressure bleed-down of the monitored fuel tank pressure; and
performing the first combustion event in the engine since the assembly of the vehicle at the second station.

19. The system of claim 18, wherein the controller includes further instructions for:
moving the vehicle through one or more stations of the assembly plant when moving the vehicle from the first station to the second station.

20. The system of claim 18, wherein the orifice has a first diameter, and wherein the controller includes further instructions for:
moving the vehicle from the second station to a third station; and
at the third station, with the engine running,
applying an engine vacuum on the fuel tank;
isolating the fuel tank from atmosphere; and
indicating the presence of an orifice having a second diameter, larger than the first diameter, in the fuel system based on a rate of fuel tank pressure bleed-up following the isolating.

\* \* \* \* \*